Sept. 7, 1926.  1,599,007
F. CRAWFORD
MOWER KNIFE AND GUARD FINGER
Filed August 23, 1922   2 Sheets-Sheet 2
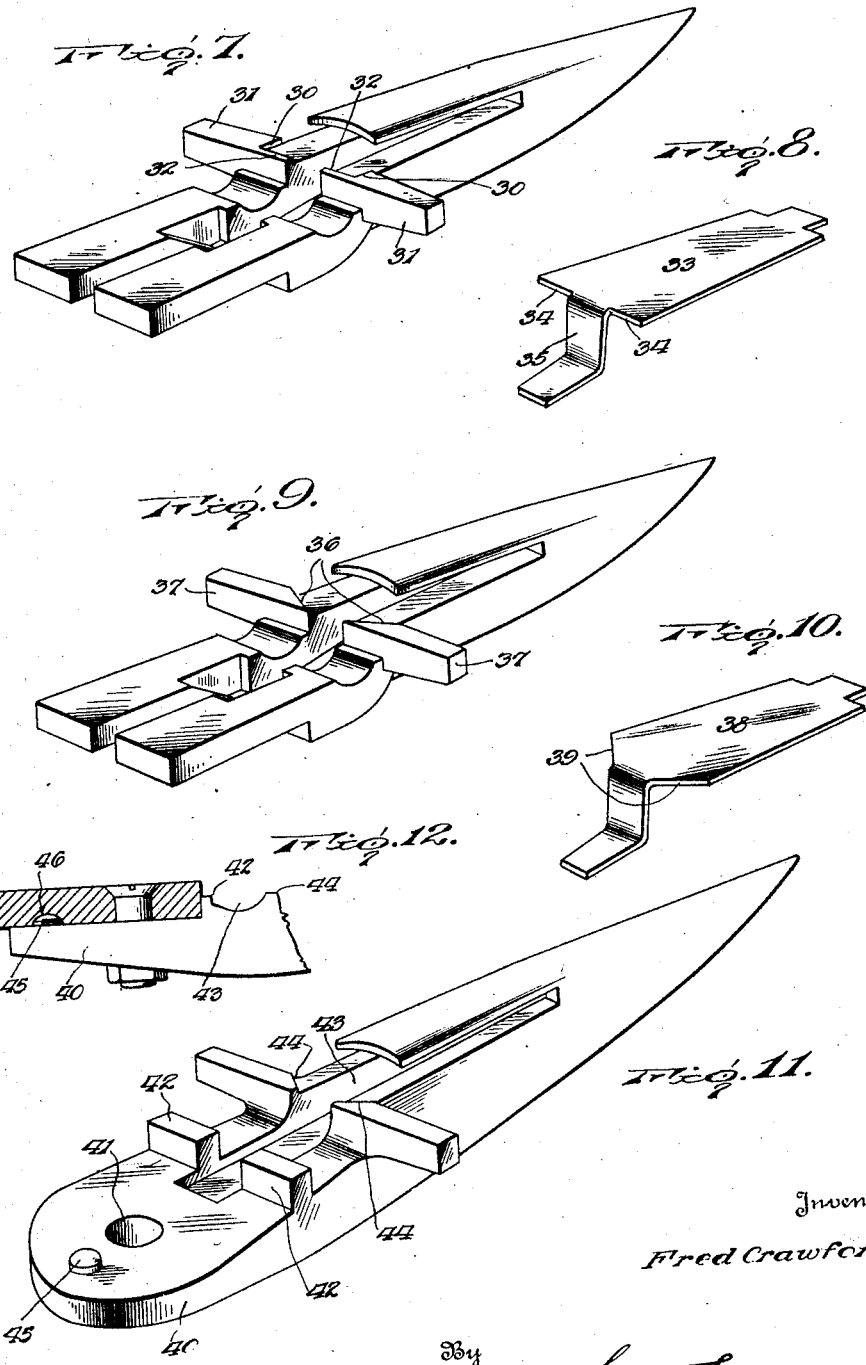

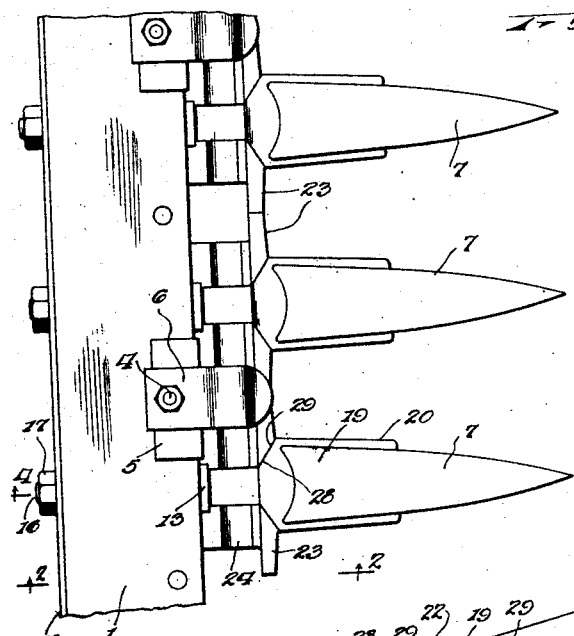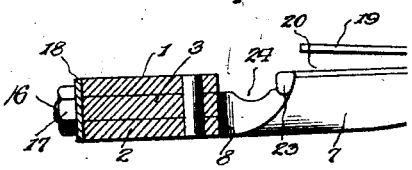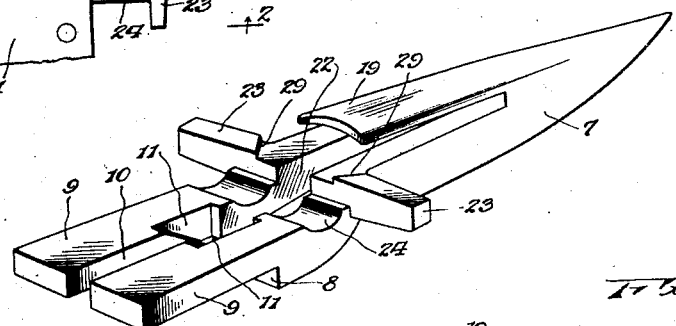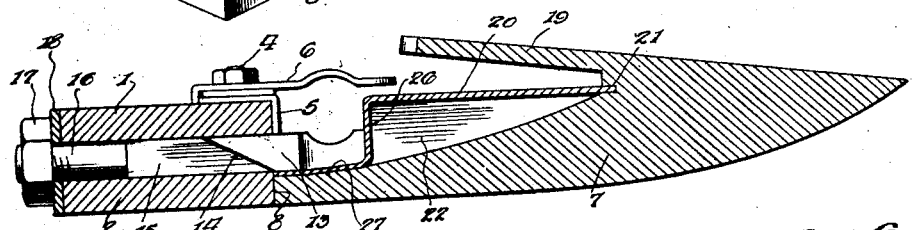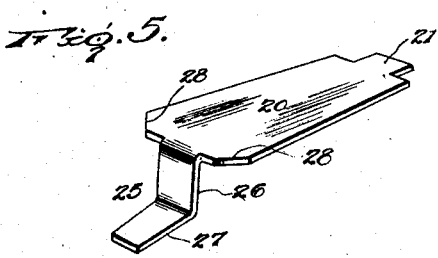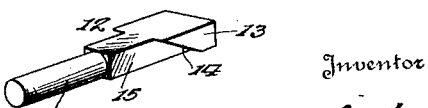

Patented Sept. 7, 1926.

UNITED STATES PATENT OFFICE.

FRED CRAWFORD, OF PROSSER, WASHINGTON.

MOWER KNIFE AND GUARD FINGER.

Application filed August 23, 1922. Serial No. 583,821.

My present invention relates to the cutting apparatus of mowing machines and harvesters and has special reference to the means for holding the stationary knives in place and to the construction of the finger bar. The invention is illustrated in the accompanying drawings and will be hereinafter fully set forth.

In the drawings—

Figure 1 is a plan view of a portion of a cutting apparatus having my improvements embodied therein;

Fig. 2 is a transverse section on the line 2—2 of Fig. 1;

Fig. 3 is an enlarged detail perspective view of a guard finger;

Fig. 4 is an enlarged section taken on the line 4—4 of Fig. 1;

Fig. 5 is a detail perspective view of the stationary knife;

Fig. 6 is a detail perspective view of the anchoring bolt;

Fig. 7 is a perspective view of a guard finger of a somewhat different form;

Fig. 8 is a perspective view of the knife to be carried by the finger shown in Fig. 7;

Figs. 9 and 10 are views similar to Figs. 7 and 8 respectively showing another form of the invention, and Fig. 11 is a perspective view of another form of guard finger;

Fig. 12 is a detail view of the rear end of the guard finger shown in Fig. 11, with the finger bar in transverse section.

The finger bar shown in Figs. 1, 2 and 4 is constructed of two flat bars 1 and 2 arranged one above the other in spaced relation and having filler blocks 3 inserted between them at intervals. The filler or spacer blocks 3 are secured in place by bolts 4 which are inserted vertically through the bars 1 and 2 and through the spacer or filler blocks, as will be readily understood, and these bolts are also utilized to secure upon the upper bar 1 a wear plate 5 which fits against the front edge of the upper bar and receives the wear which would otherwise be imposed upon the said bar by the cutter bar. Keeper plates 6 are also secured upon the upper bar by the said bolts 4, and these keeper plates project forwardly beyond the finger bar so as to extend over the cutter bar in the use of the device and thereby prevent the cutter bar rising while at work. The guard fingers 7 are of the usual tapered form in their forward portions and in their rear portions are constructed to present the transverse shoulders 8 at their lower sides which abut the front edge of the under member 2 of the finger bar. Above the transverse shoulder 8, anchoring tongues 9 extend from the body of the guard finger to fit closely between the upper and lower members 1 and 2 of the finger bar. These tongues 9 are separated to provide a slot or longitudinal space 10, as shown most clearly in Fig. 3, and this space is expanded laterally at its front end so as to present recesses or notches 11 in the opposed walls of the tongues, as will be readily understood. The forward ends of the notches are vertically disposed, while the rear ends thereof are inclined downwardly and forwardly, as clearly shown. An anchoring bolt 12 is fitted within the space or slot 10, and this anchoring bolt is of the form shown in Fig. 6, having a head 13 provided with inclined shoulders 14 on its under rear portions to bear upon the rear inclined walls of the notches 11. From the head 13, a flat-sided shank 15 extends rearwardly to engage snugly within the slot or space 10 and from the said flat-sided shank, a threaded stem 16 projects to the rear of the finger bar. The threaded stem is engaged by a nut 17 at its extremity and a washer plate 18 is extended the full length of the finger bar to bridge the rear edges of the members 1 and 2 of the same. The washer is, of course, provided at proper intervals with openings to receive the stem 16 of the anchor bolts, and when the nuts are turned home against the washer, the entire finger bar will be closed and the guard finger secured thereto.

The guard fingers are, of course, constructed with the guards 19 of the usual or any preferred form and below the said guards support the stationary knives 20 These knives are provided at their front ends with lips or tongues 21 adapted to engage sockets provided therefor in the guard finger, as will be readily understood upon reference to Fig. 4. The guard finger is constructed with a longitudinal channel 22 which merges into the slot or space 10 and the upper side of the finger is constructed also with lateral spacing lugs 23 adapted to abut the similar lugs of an adjacent finger so that the fingers will be maintained in proper spaced relation. The finger is reduced in height in rear of the spacer lugs 23 and in the upper surface of the reduced portion, I form the groove 24 which defines a channel to receive and guide the cutter bar, as will be readily understood. The stationary knife 20 is constructed with a holding tongue 25 at its rear end, which tongue depends from the knife, as shown at 26, so as to clear the front side of the cutter bar and then extends rearwardly, as shown at 27, along the base of the channel 22 and projects under the head 13 of the anchoring bolt. The rear corners of the knife are cut away diagonally, as shown at 28, so as to engage against the obliquely disposed shoulders 29 provided on the upper sides of the stop lugs 23 at the inner ends of the same. This construction facilitates the fitting of the stationary knife in place and also holds it effectually against lateral movement after it has been placed in position. The front end of the stationary knife is, of course, held against movement by the engagement of the lip 21 in the body of the guard finger and the rear end of the knife is effectually held against displacement by the engagement of the edges of the tongue 25 with the side walls of the channel 22 and through the pressure exerted upon the extremity of said tongue by the head of the anchoring bolt. By employing a single washer at the rear side of the finger bar, I effectually close the space between the upper and lower members of said bar and also aid in maintaining the guard fingers and the anchor bolts in the proper spaced relation while facilitating the assemblage of the parts and thereby reducing the cost of production.

In the form shown in Fig. 7, the vertical shoulders 30 upon the guard finger are not disposed obliquely as in the previously described form but extend across the lateral spacing lugs 31 nearly at a right angle to the length thereof and ribs or abutments 32 extend inwardly from the rear ends of said shoulders along the rear upper corners of the lugs. The knife 33 has its side edges cut on straight lines from their front to their rear extremities so that their rear portions may abut the shoulders 30 while their rear end edges 34 fit against the ribs 32, the depending portion 35 of the tongue having its rear face flush with the rear surfaces of the lugs 31.

In the form shown in Figs. 9 and 10, the vertical shoulders 36 extend obliquely across the spacing lugs 37 but terminate at the vertical side walls of the longitudinal channel in the guard finger instead of leaving an open space at each side of the channel at the top of the spacing lugs, as in the first-described form. The stationary knife 38 has its rear corners cut away obliquely, as at 39, so that the entire corners are removed. In Fig. 11, I have shown the guard finger constructed at its rear end with a portion 40 to bear against the underside of the ordinary finger bar and be secured in place by a bolt passed vertically through an opening 41 in said portion 40 and through the finger bar, the guard finger having upstanding lugs 42 to bear against the front edge of the finger bar. The longitudinal channel 43 and shoulders 44 may be of any of the described forms. Near the rear extremity of the finger, a lug 45 is provided on the upper flat surface of the portion 40 to engage snugly in a socket 46 in the under side of the finger bar 47.

Having thus described the invention, what is claimed as new is:—

In a cutting apparatus for mowers, the combination with a finger bar having finger-receiving spaces, of guard fingers having their rear end portions fitting into said spaces, each guard finger having a knife-receiving seat and a groove extending longitudinally of the seat and beyond the rear end thereof and merging into a longitudinally extending slot open at its rear end, the side walls of the slot being formed with opposed recesses extending forwardly beyond the forward end of the slot into the side walls of the groove, and having a tongue depending from its rear end into said groove and extending to the rear end of the groove, and a fastener including a shank extending longitudinally in said slot and projecting from the rear end thereof for engagement with the finger bar, and a head at the forward end of said shank having extended side portions fitting into said recesses and having its forward end portion resting upon the rear end portion of said tongue to hold the tongue and rear end portion of the knife against upward movement.

In testimony whereof I affix my signature.

FRED CRAWFORD. [L. S.]